Jan. 27, 1948.  K. B. GEERTSEMA  2,435,137
LONG-SHAFT STUD DRIVER
Filed Jan. 25, 1945  2 Sheets-Sheet 1

INVENTOR.
KENNETH B. GEERTSEMA
BY Walter S. Oleston
ATTORNEY.

Jan. 27, 1948.  K. B. GEERTSEMA  2,435,137
LONG-SHAFT STUD DRIVER
Filed Jan. 25, 1945  2 Sheets-Sheet 2
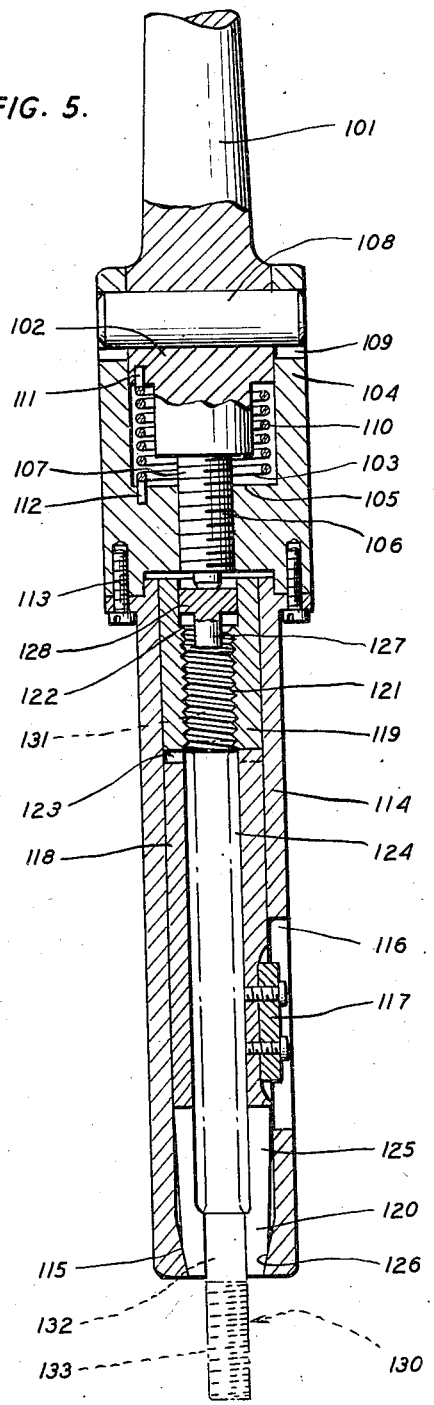
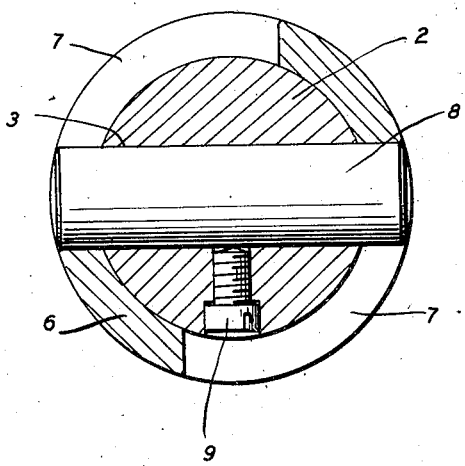
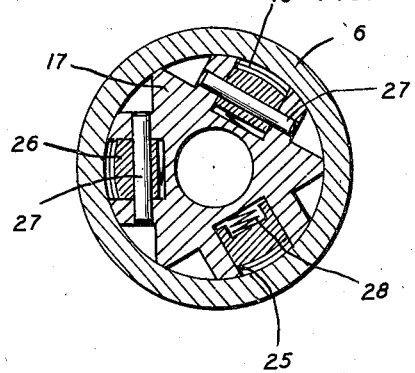
INVENTOR.
KENNETH B. GEERTSEMA
BY
ATTORNEY.

Patented Jan. 27, 1948

2,435,137

UNITED STATES PATENT OFFICE 2,435,137

LONG-SHAFT STUD DRIVER

Kenneth B. Geertsema, Valley Stream, N. Y., assignor to Aircraft Screw Products Company, Inc., Long Island City, N. Y., a corporation of New York Application January 25, 1945, Serial No. 574,497

10 Claims. (Cl. 81—113)

The invention relates to a stud driver, and more in particular to a driver for long-shafted studs. Studs of the kind here under consideration have, in general, both end portions threaded, the one to be screwed into a boss and the other one for the engagement of a nut or other interiorly threaded member to be secured to such boss. For shortness, in the description hereinafter and in the claims, the first mentioned end portion will be referred to as the lower thread or boss-engaging portion of the stud, and the other end portion as the upper thread or nut-engaging portion. Stud drivers of a conventional type, as, e. g., disclosed in U. S. Patent No. 2,334,088, are provided with interiorly threaded jaws to grip the upper thread portion of the stud, and the grip of the jaws is tightened when, owing to the end of that portion engaging an abutment of the tool, an axial force is set up between the threadings of the jaws and the gripped portion under the action of a torque applied to drive the stud home in the boss. Such a tool operates satisfactorily if applied to a short stud. If, however, the stud has a relatively long shaft portion between the upper and lower thread portions, the conventional tool is objectionable because the total torque required to screw the stud into the boss must be transmitted through the length of the shaft from the upper to the lower portion of the stud. Particularly, if the shaft is relatively slim and dimensioned to withstand merely or at least mainly the occurring axial forces of normal use, the mentioned torque may dangerously overstress the stud shaft. Further, the conventional driver of the mentioned type may be objectionable in certain instances owing to the fact that it subjects the threading of the nut-engaging portion not only to the ordinary stresses of a screw connection but simultaneously to the very appreciable radial compression of the grip of the jaws. It may happen, therefore, that the threading of the upper end of the stud becomes deformed under the application of the driver so much so that the nut fit for which the threading was cut will be impaired.

The invention aims to provide a stud driver which is free of the criticized drawbacks of the conventional type, and it consists mainly in the combination of means wherein the grip of the jaws occurs at a stud portion other than the nut-engaging portion and close to the boss-engaging portion while the axial forces to tighten the jaw grip act or react on the end of the nut-engaging portion of the stud bearing against an abutment of the tool.

The invention also provides the combination of means to hold the jaws expanded for the passage through them of the upper thread portion and of a portion between that upper thread portion and the boss-engaging portion with means to close the jaws to a position in which a predetermined portion of the stud shaft can engage the jaws or the jaws can engage such portion, and with other means to tighten the grip of the jaws when such engagement has occurred.

Further objects and details of the invention will be apparent from the description given hereinafter and the accompanying drawing illustrating two embodiments thereof by way of example.

Figures 1, 2, 2A:
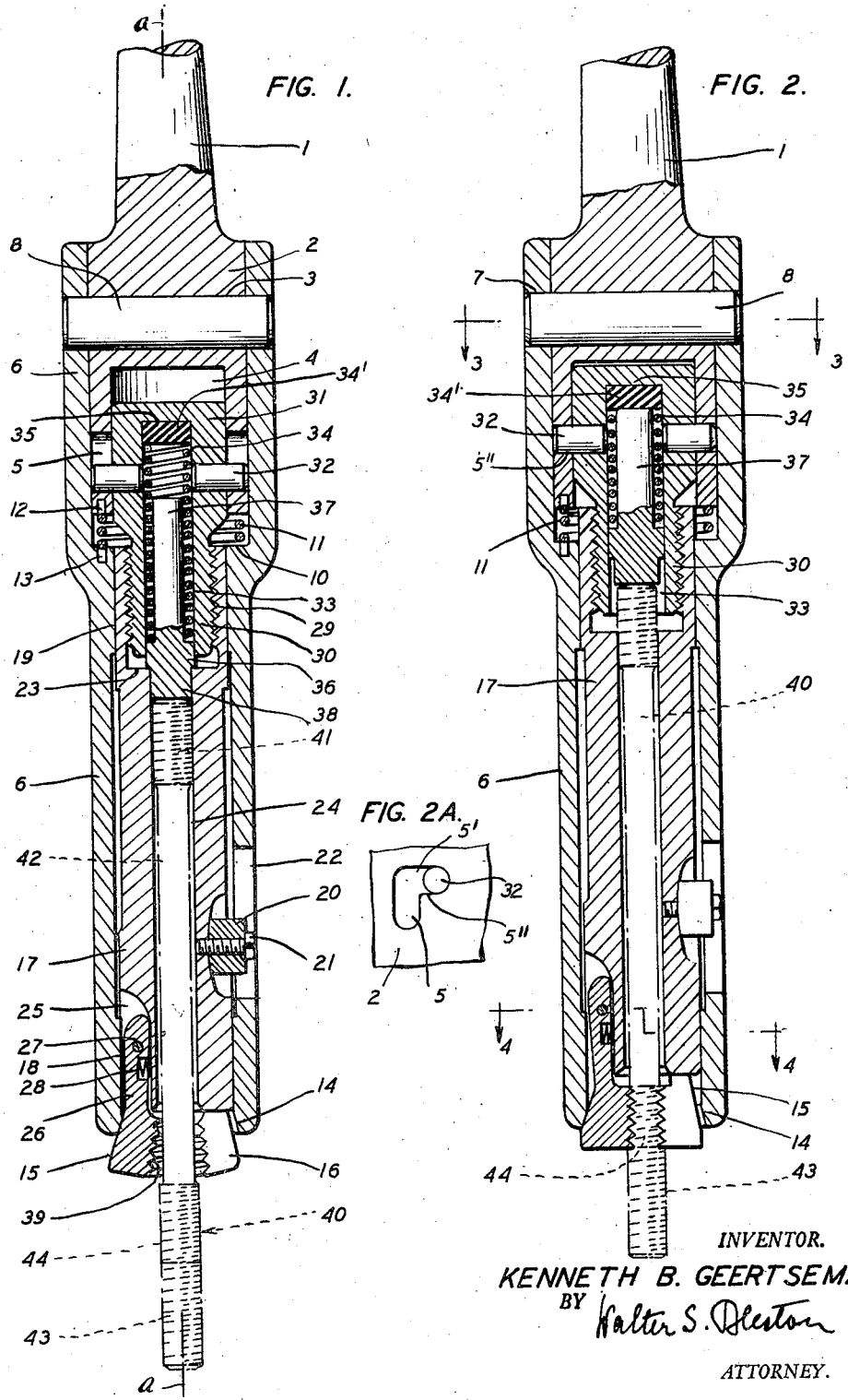
Fig. 1 is a longitudinal cross-section of a stud driver according to the invention and in a position of the jaws prior to the application of the tool to a stud.
Fig. 2 is a similar cross-section of the tool in a position of the jaws in engagement with the stud and ready for tightening their grip.

Figs. 3 and 4 are cross-sections along lines 3—3 and 4—4 respectively, of Fig. 2; and Fig. 2a is a partial side view of a part thereof; and Fig. 5 is a cross-section of another embodiment of the invention.

Referring now to the drawing, Figs. 1 to 4, the illustrated stud driver comprises a driving shank 1 to which a driving torque may be applied either by hand or by a prime mover not shown. The shank includes a head 2 with a cross-bore 3 and a cylindrical cavity 4; the side wall of which is provided with two L-shaped slots 5 extending opposite each other and parallel to the tool axis a. An elongated outer shell 6 encompasses, with its upper portion, the shank head 2 and is provided, in its wall, with two slots 7 extending opposite each other through a predetermined arc substantially in a plane at right angles to the tool axis a, as clearly shown in Fig. 3. A pin 8 is secured by a set screw 9 in the bore 3 of the shank and projects with its ends into the slots 7 so as to prevent the shank and shell from axial movement relatively to each other but to permit relative rotation through an arc according to the length of the slots 7. The shell 6 is provided with an inner shoulder 10 at a distance below the shank head 2, and a torsion spring 11 is located between and anchored with its ends 12 and 13 to the lower face of that head and the shoulder 10. The spring is so wound as to offer a resistance to a rotation of the shank relatively to the shell in the direction of the threading of a stud for which the tool is destined. The lower end of shell 6 is interiorly flared or provided with outwardly slanting inner surfaces 14 cooperative with outer inclined faces 15 of jaws 16 being part of a stud-engaging member which also comprises an inner shell 17 with which the jaws are either integral or to which the jaws are secured as in the embodiment of Figs. 1 to 4. The inner shell 17 is guided for coaxial movement by guiding faces 18 and 19 in the outer shell, and is prevented from rotation relatively to the latter by a key 20 secured to the inner shell by means of a screw 21 and engaging a slot 22 in the wall of the outer shell. The major portion of shell 17 extending from an inner shoulder 23 downward has an axial bore 24 of a width sufficient to accommodate the maximum diameter of the nut engaging portion and of the shaft portion of a stud to be received within the bore as it will be described hereinafter. The lower end of shell 17 is provided with as many longitudinal recesses 25 as there are jaws 16, i. e., three in the illustrated embodiment. Each jaw has a shaft 26 engaging one of the recesses 25 hinged to the recess wall by means of a pivot pin 27, so that the jaws can open and close. Resilient means, such as springs 28 between each jaw and the inner shell tend to hold the jaws open or expanded as far as the engaging faces 14 and 15 will permit. On the other hand, the jaws will be closed or contracted against the restraint of the springs 28 when the inner shell 17 is shifted upwards in relation to the outer shell 6. The upper end of the inner shell 17 has an outer diameter not larger than the inner diameter of the cavity 4 of the shank head 2. It is provided with an inner threading 29 engaged by a driving screw 30 the head 31 of which fits into the shank cavity 4. Pins 32 secured to the screw head 31 and engaging the slots 5 couple the screw head and the shank head for common rotation but permit a relative axial shift according to the length of the slots. Screw 30 is provided with an axial bore 33 reaching from the lower end of the screw to close to its top. A rather soft compression spring 34 bears with its one end on another somewhat resilient member such as a hard rubber cushion 34' which in turn bears against the upper wall 35 of bore 33, and with its other end against a collar 36 of a plunger-like pin 37 axially movable within the bore 33 and so dimensioned that the collar 36 can bear on the shoulder 23 of the inner shell 17. The pin 37 may have a lower extension 38 of a length selected according to the dimensions of the stud to be driven, and by exchanging the pin 37 for one with longer or shorter extension 38 the tool may be used for studs of various lengths.

The stud driver just described is intended to be applied to a stud substantially of a form indicated in dot and dash lines in Figs. 1 and 2. This stud denoted by 40 has an upper thread or nut-engaging portion 41, a relatively long shaft 42 of reduced diameter extending downward from that portion 41, a lower thread or boss-engaging portion 43, and, intermediate the latter and the shaft, a portion 44 which is threaded so that its threading may constitute a continuation of that of the boss-engaging portion. According to such a stud, the jaws 16 of the driver are provided with an inner threading 39 to fit the stud portion 44, and the pin 37 is so selected that in the position of Fig. 1 portion 44 of a stud inserted into the shell bore 24 is just below the jaws when the upper end of the stud abuts against the lower end of the pin extension 38. For studs with shorter shafts, a pin of an accordingly longer extension 38 is to be used, and a pin of shorter extension is to be applied when the stud is longer.

Before the tool is applied to a stud, all parts are in the position illustrated in Fig. 1, that is to say spring 11 has turned shell 6 and connected parts in the position of Fig. 3 in relation to shank 1, screw 30 with the inner shell connected thereto by threading 29 are in their lowermost position defined by pin 32 abutting against the bottom of slot 5, owing to the weight of the parts. (Additional means not shown may be provided if the tool is to be applied in a direction upward rather than downward and if the jaw springs 28 in cooperation with the incline of the faces 14 and 15 are not strong enough to out-balance the weight of the screw 30 and shell 17.) In this position, the jaws projecting far downward are wide open under the action of the springs 28. The tool may now be brought into axial registry with a stud 40 which preferably has been screwed by hand into the first one or two threads of the tapered hole in which the stud is to be secured. The tool is then lowered so that the stud enters through the jaws into the bore 24. When the upper end of the stud engages the pin 37 and lowering of the tool is continued screw 30 with the pin 37 and the inner shell 17 with the jaws 16 are lifted in relation to the outer shell 6. In order to make this movement possible the force of spring 34 need be only slightly stronger than the weight of the mentioned parts plus the value of the resistance caused by the springs 28. The upward movement of the screw 30 is stopped when the pins 32 reach the upper ends of the slots 5. The dimensions are so selected that at this instance, the jaws owing to the cooperation of the faces 14 and 15 are so far closed that the jaw threading can be engaged by the threads of the stud portion 44. If now, the shank 1 is turned pins 32 enter the cross-arm 5' of the L-slots 5 thereby locking the screw and outer shell against relative axial movement. Bearing against the ends of these arms the pins take the screw 30 and inner shell 17 along. Should the friction between the inner and outer shell be greater than between the threading of the jaws, it may happen that the pins enter the slot portions 5' at a later time as will be described hereinafter. This, however, is immaterial as to the functioning of the tool. Owing to the turning of shell 17 the jaws are screwed on stud portion 44 with the effect that the upper end of the stud pushes pin 37 upward within screw 30 against the restraint of spring 34. When stud portion 44 is screwed entirely into the jaws, pin 37 bears against the rubber member 34'. This is the position of Fig. 2, and it is to be noted that still there is no tightening of the jaws about the stud. However, the parts are jammed in this position relatively to the stud. If rotation is continued whereby the torque may increase, the shank will now turn in relation to the screw 30 so that the pins 32 will bear against the ends of the cross-arms 5' of the L-slots 5 if this has not yet happened according to the foregoing statement. Further rotation of the shank together with screw 30, will cause these parts to turn, against the restraint of spring 11, in relation to the outer shell 6 as far as the slots 7 engaged by pin 8 will permit, whereupon the outer shell 6 will also be taken along. The screw thread connection between screw 30 and the inner shell 17 will then cause an upward shift of the latter in relation to the outer shell with the result that the grip of the jaws is tightened on the stud owing to the cooperation of the inclined faces 14 and 15. As soon as this grip is strong enough to overcome the friction between the boss-engaging portion of the stud and the tapped hole, the torque applied will turn the entire tool and stud to screw the latter home. In connection with the operation of the tool it is to be noted that the resilient cushion 34' and the arm 5' of slot 5 are provided as a safety measure and may be omitted in many cases. If this is done pin 37, in a position similar to that of Fig. 2 will directly bear on the bottom 35 of the bore 33 of the screw 30. If, then, the described relative rotation between the screw 30 and the inner shell 17 occurs, an axial force component will be set up owing to the threading 29 so that a reaction might take place from that threading through shell 17, the screw connection of the jaws and the stud, then upwards through the stud and pin 37, transmitted to the bottom of the screw 30 and through the latter back to the threading 29. The stress thus occurring where the jaws engage the stud portion 44 may have the effect that the threads of the stud are stripped. This can be avoided by the provision of the cushion 34' and the cross-arms 5'. It has been stated that in the position of Fig. 2 the pins 32 are located in the cross-arms 5'. In consequence, the pins can bear on the lower face 5'' indicated in Fig. 2a, whereas the stud 40 and pin 37 can still move slightly upwards in relation to the screw 30 according to the resiliency of the rubber 34'. Considering, now, the flux of the axial force occurring when shell 17 is lifted in relation to screw 30, and originating in the threading 29, the path of that force will be again through shell 17 and jaws 15. Since, however, there is not sufficient resistance to an upward movement of pin 37 owing to the cushion 34', the force or at least an appreciable portion of it will be transmitted from the jaws to the outer shell and from there through pin 8 and shank 1 which with the faces 5'' of the L-slots supports the pins 32. Pins 32 finally complete the path of the forces back to the screw 30. Hence the provision of the cushion 34' and the cross-arms 5' are useful to relieve the stud threading from excessive stresses.

When the tool is to be detached from the inserted stud a torque in the opposite direction under the assistance of spring 11 will first return shell 17 and the jaws to the position of Fig. 2, whereupon the tool can be readily screwed off the stud.

From the foregoing it will be clear that the tool just described is useful to drive long-shafted studs, and that it is applicable even if a portion of the shaft or the nut engaging portion has a diameter larger than the opening of the jaws in their position before their grip is tightened, and further that the tool is operative without subjecting the stud shaft to the stresses of the driving torque and without endangering the threads of the boss-engaging portion and of the nut-engaging portion by the clamping action of the jaws.

In certain instances it is undesirable, that a portion of the stud in continuation of the boss-engaging portion is provided with a threading such as the portion 44 in Fig. 1. In such a case the jaws, rather than being interiorly threaded, may have an inner suitably shaped surface, preferably roughened, e. g., knurled, to increase the friction between the jaws and the stud. However, in this connection, it is to be noted that operation of the tool requires an axial force being set up between the stud and certain parts of the tool. In the embodiment of Figs. 1 to 4 the reaction to such force occurs in the threading of the jaws. If non-threaded jaws are used in that tool, the entire tool must be pressed down upon the stud so that a reaction would occur between the threading of the boss and the boss-engaging portion of the stud. As in the beginning of the driving operation the stud will engage the boss with only a very small portion of the threading, e. g., only one or two thread convolutions, the threading may be overstressed by the axial pressure of the tool. This can be avoided if the inner shell 17 proper is provided with an inner threading to be engaged by another threading of the stud shaft or by the nut-engaging portion of the stud. Such a structure is illustrated in the modification of Fig. 5.

The tool according to Fig. 5 comprises the shank 101 with head 102 which fits into the cavity 103 of a cup-shaped member 104. From the bottom 105 of the cavity downward member 104 is provided with an interior threading 106 into which an exteriorly threaded extension 107 of the shank head 102 engages. A pin 108, similar to the pin 8 in Figs. 1 and 3, is secured to the head 102 and its ends project into slots 109 formed in member 104 similarly to the slots 7 of Fig. 3. However, slots 109 are wider than the pin 108 to allow for a limited relative axial movement of member 104 when the head 102 is screwed in or out of the threading 106 according to the length of the arcs of the slots 109. It will be clear that the pin 108 will be inserted and secured to the head 102 only after the latter with its extension 107 has been originally screwed down in the position of Fig. 5. The shank head 102 and member 104 are further connected to each other by a torsion spring 110 located in the cavity 103 and anchored with its ends 111 and 112 in the mentioned parts respectively. Attached by screws 113 to the member 104 is the outer shell 114 which at its lower end is interiorly flared at 115 so as to taper towards the outside. The outer shell is further provided with a longitudinal recess 116 in its side wall to receive therein a key 117 secured to the stud-engaging member which includes the inner shell 118, an upper part 119 and the jaws 120. Part 119 is provided with an interior threading 121 mating the nut-engaging thread of a stud to which the tool is intended to be applied and is further provided with an inner shoulder 122 on top of the threading 121. The portion 119 may be made integral with the sleeve 118 or connected thereto by dogs 123 or other suitable means in order to exchange it for another one with different inner threading 121 so as to render the tool applicable for studs of various sizes. Shell 118 has an inner bore 124 sufficiently wide to permit passage of the widest part of the upper stud threading and of the stud shaft. The lower end of shell 118 is slitted so as to form the aforementioned jaws 120 and the structure is such that the shafts 125 of the jaws tend to spring outward. The outward spreading of the jaws is limited by their inclined outer face 126 cooperating with the inclined face 115 of the outer shell. It is, of course, possible too to make the jaws as separate pieces and connect them to the inner shell in the manner shown in Fig. 1. A pin 127 with an upper flange 128 is inserted into the upper portion of part 119 so as to be axially movable and rotatable between the shank head extension 107 and shoulder 122.

When the tool is first lowered on a stud 130 in the manner described with respect to the first embodiment of the invention, the upper end of the stud with its nut-engaging portion 131 will push the jaws 120 with sleeve 118 and part 119 upward in the outer shell 114 so that the jaws 120 open wide enough to permit the stud to enter if in the original position the jaws were not already sufficiently spread apart. The tool is then further lowered until the stud threading 131 is directly below the thread 121 of part 119. When now a torque is applied to the shank 101 the tool with threading 121 will be screwed on the stud which thus is axially advanced within the stud-receiving parts until pin 127 is pushed upward against the shank head extension 107, and the shell 118 is so far lowered in relation to the outer shell 114 that the jaws 120 close around the stud portion 132 directly above the boss-engaging threading 133. It is of course necessary to preselect the dimensions of the tool so in relation to the stud that the jaws engage the desired stud portion. It will be clear that the movement of the jaws while they close on stud portion 132 is a helical one in relation to the stud owing to the engagement of the nut portion 131 with the thread 121. However, while the jaws tighten their grip on the stud no relative movement should occur between these parts, first in order to avoid wear, and second because of the fact that friction at rest is higher than under motion. For this reason the torsion spring connection is provided between the shank and the outer shell. This has the following effect: When owing to the initial closing of the jaws a certain friction and thus resistance is set up the shells will stop turning about the stud and rotation of the shank in relation to member 104 will take place against the restraint of the torsion spring 110. Owing to the engagement of the shank head with the threading 106, member 104 and with it the outer shell 114 will be raised relatively to the shank 101 and also relatively to the inner shell 118. In consequence, the inclined faces 115 will act on the outer surface of the jaws 126 to tighten the grip of the latter. When under such relative rotation of the shank 101 spring 110 is sufficiently tensioned the grip on the stud will be such that any increase of the torque will drive the stud into the tapped hole of the boss member.

Now it will be clear that owing to the particular operation of the tool and although the nut-engaging portion of the upper stud portion is in engagement with the threading 121, no driving torque is transmitted through the shaft of the stud. The upper stud portion in fact is subjected to stresses similar only to those occurring in the actual use of the stud and the clamping action of the jaws and the transmission of the setting torque to the boss-engaging portion of the stud occurs in close proximity to the latter and at a portion of the stud which is not injuriously affected by the occurring stresses.

It will be apparent to those skilled in the art that many alterations and modifications of the structure shown and described may be made without departing from the essence and spirit of the invention which shall not be limited but by the scope of the appended claims.

I claim:

1. A stud driver comprising a driving shank, an elongated outer shell member connected coaxially to said shank for common rotation with a limited lost motion, an inner shell member axially movable but nonrotatable in relation to said outer shell and substantially within the latter, said inner shell including spreadable and contractible jaws at its end remote from said shank and being so shaped as to receive in its interior an elongated shaft of a stud to be set, said outer shell and said jaws having cooperating faces to contract said jaws upon movement of the latter in an axial direction relatively to said outer shell, means tending to hold said jaws in expanded position prior to the insertion of said stud shaft into said inner shell, a pin axially movable in the other end of said inner shell, a screw-threaded part in connection with said shank for common rotation and engaging a threading of one of said shell members, said part constituting an abutment for said pin, means to transform axial pressure exerted by said stud when engaging said pin into a shifting movement of said inner shell in relation to said outer shell so as to cause contraction of said jaws to a position preparatory to gripping said stud, and a torsion spring secured with its ends to one of said shell members and said shank respectively to restrain rotation of said shank relatively to said shells through the angle of said limited lost motion.

2. A stud driver comprising a driving shank, an elongated outer shell member connected coaxially to said shank for common rotation with a limited lost motion, an inner shell member axially movable but non-rotatable in relation to said outer shell and substantially within the latter, said inner shell including spreadable and contractible jaws at its end remote from said shank and being so shaped as to receive in its interior an elongated shaft of a stud to be set, said outer shell and said jaws having cooperating faces to contract said jaws upon movement of the latter in an axial direction relatively to said outer shell, means tending to hold said jaws in expanded position prior to the insertion of said stud shaft into said inner shell, a screw-threaded part coaxial and in connection with said shank for common rotation and engaging a threading of one of said shell members, said part including an abutment for said stud to limit the distance to which said stud may be inserted into said inner shell from the side of said jaws, means to transform axial pressure exerted by said stud upon said part into a shifting movement of said inner shell in relation to said outer shell so as to cause contraction of said jaws to a position preparatory to gripping said stud, and a torsion spring secured with its ends to one of said shell members and said shank respectively to restrain rotation of said shank relatively to said shells through the angle of said limited lost motion.

3. A device as claimed in claim 2, said means to transform axial pressure comprising an interior threading of said shell member, near its end remote from said jaws, for engagement by a threaded portion of said stud.

4. A device as claimed in claim 2, the connection of said shank and said outer shell comprising a removable and insertable member so as to permit adjustment of said screw-threaded part in relation to said outer shell.

5. A stud driver comprising a shank member, an outer shell-like member, said shank and said shell member including inter-engaging screw-threaded portions, detachable means in engagement with said members to limit rotation of the one relatively to the other to a predetermined angle, a torsion spring secured with its ends to said members respectively, an elongated inner shell substantially interiorly of said outer shell and axially movable but non-rotatable in relation thereto, said inner shell including jaws at its end remote from said shank and also including an inner threading for engagement by a threading of a stud inserted into said inner shell from the side of the jaws, said jaws and said outer shell including interengaging slanting faces, whereby said inner shell will be shifted axially to close said jaws about a portion of said stud remote from said inner threading when said stud is screwed into the latter so as to exert axial pressure on the threaded shank portion, and the grip of the jaws will be tightened when said shank is turned in relation to said outer shell against the restraint of the said spring.

6. A stud driver comprising a shank with a hollow head, an outer shell member encompassing said head with one of its ends, a means connecting said head to said shell so as to permit turning of the shank and shell relatively to each other through a predetermined angle but to prevent relative movement in axial direction, an inner shell member axially shiftable but non-rotatable in relation to said outer shell member, said inner shell member being adapted to receive therein the shaft of a stud to be set and including jaws at one of its ends, said jaws having slanting faces cooperative with other slanting faces of said outer shell member, said inner shell member being provided with a first interior threading at its other end, said jaws being provided with a second interior threading for engagement of a threading of said stud, a torsion spring secured with its ends to one of said shell members and said shank respectively, a screw engaging said first inner shell threading and including a head engaging into said shank head and being secured thereto for common rotation but axially shiftable a predetermined distance in relation thereto, a pin axially movable in a central bore of said screw so as to constitute an abutment for said stud when inserted in said inner shell, and a compression spring between said pin and said screw.

7. A stud driver as claimed in claim 6, the dimensions of the parts being so selected that said screw is shiftable in relation to said shank head a distance equivalent to the movement of the jaws from a fully open position to a position for engagement of said stud substantially without gripping force.

8. In a stud driver the combination of an inner shell, including interiorly threaded jaws to engage a stud threading, an outer shell in co-axial engagement therewith, said jaws and said outer shell having co-operative slanting faces to close the jaws by a relative movement of the shells, a screw member engaging with its threading said inner shell, a torque-transmitting connection allowing for a limited relative axial movement between said screw member, means including a resilient member in connection with said screw and receptive of axial pressure exerted thereon by said stud when engaging the threading of said jaws upon application of said tool, and locking means in the connection of said screw and outer shell to prevent axial movement of the one in relation to the other and operative when a relative axial movement of predetermined length has occurred.

9. A device as claimed in claim 8, said locking means of said screw member and said outer shell member comprising an L-shaped slot of the one and a pin secured to the other one of said members and engaging said slot.

10. A stud driver comprising in combination a shank member including a threaded end portion, an outer shell member having a threaded portion engaged by said end portion, an additional connection of said shank and said outer shell, said connection including a torsion spring and means to limit a helical relative movement of the connected members, an inner shell non-rotatable but axially movable a limited distance within the outer shell, the end of the inner shell, remote from said shank, forming jaws to grip a stud inserted into the inner shell, the jaws and the outer shell having co-operative slanting faces to close the jaws by an axial shift of the one shell relatively to the other, the inner shell, near its other end, being interiorly threaded to receive therein the threaded end of said stud, and means to transmit to said shank the reaction to axial pressure exerted by said stud on the threading of said inner shell thereby to cause an axial shift of the shell members relatively to each other.

KENNETH B. GEERTSEMA.

REFERENCES CITED

The following references are of record in the file of this patent:

UNITED STATES PATENTS

| Number | Name | Date |
|---|---|---|
| 1,463,497 | Bugatti | July 31, 1923 |
| 2,257,089 | Caminez | Sept. 30, 1941 |
| 2,069,527 | Kirkland | Feb. 2, 1937 |
| 1,615,201 | Stowe et al. | Jan. 18, 1927 |
| 1,492,466 | Jarmolowsky | Apr. 29, 1924 |

FOREIGN PATENTS

| Number | Country | Date |
|---|---|---|
| 13,979 | Great Britain | June 15, 1909 |